United States Patent [19]
Nagan

[11] Patent Number: 5,900,116
[45] Date of Patent: May 4, 1999

[54] METHOD OF MAKING PAPER

[75] Inventor: Leo E. Nagan, Mercer Island, Wash.

[73] Assignee: Sortwell & Co., St. Simons Island, Ga.

[21] Appl. No.: 08/858,242

[22] Filed: May 19, 1997

[51] Int. Cl.$^6$ .................................................. D21H 21/10
[52] U.S. Cl. .................. 162/158; 162/168.3; 162/181.6; 162/183
[58] Field of Search ............................ 162/168.2, 168.3, 162/181.1, 181.6, 183; 210/723, 727, 734

[56] References Cited

U.S. PATENT DOCUMENTS

| | | | |
|---|---|---|---|
| 4,213,874 | 7/1980 | Williams et al. | 252/174.25 |
| 4,305,781 | 12/1981 | Langley et al. | 162/164 R |
| 4,388,150 | 6/1983 | Sunden et al. | 162/175 |
| 4,753,710 | 6/1988 | Langley et al. | 162/164.3 |
| 4,954,220 | 9/1990 | Rushmere | 162/168.3 |
| 4,980,025 | 12/1990 | Andersson et al. | 162/168.3 |
| 5,176,891 | 1/1993 | Rushmere | 423/328.1 |
| 5,185,206 | 2/1993 | Rushmere | 428/403 |
| 5,312,595 | 5/1994 | Moffett et al. | 422/129 |
| 5,470,435 | 11/1995 | Rushmere | 162/181.6 |
| 5,482,693 | 1/1996 | Rushmere et al. | 423/328.1 |
| 5,501,774 | 3/1996 | Burke | 162/164.1 |
| 5,503,820 | 4/1996 | Moffett et al. | 423/333 |
| 5,543,014 | 8/1996 | Rushmere et al. | 162/181.6 |
| 5,584,966 | 12/1996 | Moffett | 162/168.1 |
| 5,596,530 | 1/1997 | Moffett | 162/164.1 |
| 5,681,480 | 10/1997 | Langley et al. | 210/727 |

FOREIGN PATENT DOCUMENTS 0 551 061 A1  7/1993  European Pat. Off. .
WO 96/05139   2/1996  WIPO .

OTHER PUBLICATIONS

Sneed, M. Cannon and Maynard, J. Lewis, *General Inorganic Chemistry*. (D. Van Norstrand Co., Inc., 1943) pp. 711–713.

Pummer, von H., *Selektive Füllstoffretention and optische Eigenschaften des Papiers*. (1973) pp. 417–422.

Cotton, F. Alberto and Wilkinson, Geoffrey, *Advanced Inorganic Chemistry*. (John Wiley & Sons, 1980) pp. 389–392.

*McGraw–Hill Encyclopedia of Chemistry*. (McGraw–Hill Book Co., 1983) p. 618.

Moffett, Robert H., *On–site production of a silica–based microparticulate retention and drainage aid. Tappi Journal*, vol. 77, No. 12 (Dec. 1994), pp. 133–138.

*Kirk–Othmer Encyclopedia of Chemical Technology*. (1995 ed.), vol. 16, pp. 888–925.

Olphen H. Van, *An Introduction to Clay Colloid Chemistry*. (John Wiley & Sons, Date Unknown), pp. 57–68.

*Colloidal Silica–Concentrated Sols*. (Date Unknown), pp. 407–410.

*Non–Transition Elements*. (Date Unknown), pp. 472–474.

International Preliminary Examination Report dated Oct. 19, 1998 in International Application PCT/US98/09919.

*Primary Examiner*—Peter Chin
*Attorney, Agent, or Firm*—Marshall, O'Toole, Gerstein, Murray & Borun

[57] ABSTRACT

A method of coagulating particulates, as in papermaking or water clarification applications, for example, is provided wherein a zeolite crystalloid coagulant is added to water containing the solid matter, a source of multivalent cations, and a cationic acrylamide polymer. The zeolite crystalloid coagulant is preferably prepared by admixing aqueous sodium silicate and sodium aluminate solutions to form a reaction mixture and allowing a reaction to proceed for a sufficient time to form a zeolite crystalloid coagulant particles having particle sizes of at least about 4 nm before terminating the reaction.

20 Claims, No Drawings

METHOD OF MAKING PAPER

BACKGROUND OF THE INVENTION

1. Field of the Invention

The invention relates generally to water treatment and, more particularly, the invention relates to the use of zeolite crystalloids as coagulants in the clarification of water or to promote improved retention, drainage, and formation in the manufacture of paper and paperboard.

2. Description of Related Technology

Considerable expenditures are made each year for materials used in water treatment, such as coagulants and flocculants used to clarify raw waters for potable and industrial use; to clarify process water streams such as deinking water in paper recycling plants and mining wash water circuits; and to clarify industrial and municipal effluent waters, for example. Coagulants and flocculants are used to improve the efficiency of the papermaking process by improving the first pass retention of fiber and filler, and formation and drainage, on the paper machine forming wire. Therefore, the demand for more efficient, inexpensive water treatment compositions for use as coagulants and flocculants is increasing.

Widely used as coagulants and flocculants in the clarification of raw waters, process waters, and effluent waters are chemicals such as alum, sodium aluminate, polyaluminum chloride, activated silica, bentonite clays, inorganic iron salts, low molecular weight organic cationic polymers, high molecular weight organic polymers, and others. Some of these coagulants and flocculants may be used by themselves; however, in many cases various combinations of these materials may produce more efficient results, depending upon the nature and requirements of the water to be clarified.

The manufacture of nearly all fine paper worldwide is now done at alkaline pH levels (about 8.0 to 8.4 pH) using calcium carbonate pigment as a filler along with bleached wood cellulose fiber (some cotton cellulose is used in specialty papers). A current favored method of obtaining good sheet formation, good first pass retention of fiber and filler on the traveling formation wire, and rapid water drainage through the wire is to add rather high dosages (often three lbs per ton of dry furnish or more) of a synthetic high molecular weight cationic retention aid polymer flocculant to the machine furnish stream at the fan pump so as to utilize the high mixing forces at that point to deflocculate. Some believe so-called microflocs are, in part, created with this technique. However, if the use of the flocculant in this manner is all that is done, the retention of fiber and filler would be poor.

To provide superior retention, drainage, and formation, a coagulant is added before, or after the rotary screens located between the fan pump and the paper machine headbox. Generally known as microparticulates and of negative charge, these coagulants act as a bridge between the fibers, fines, and fillers.

The first such coagulant aid in wide use in papermaking was a bentonitic montmorillonite clay. Also now in use are colloidal silicas, modified colloidal silicas, polysilicate microgels, and very low molecular weight organic polymers, which are suggested to be sols on the basis of the very small water droplets emulsified in an oil carrier during the manufacturing process.

Regarding the use of microparticulates and cationic polymers as coagulation and retention aids in the manufacture of paper, U.S. Pat. No. 4,753,710 teaches that bentonite is essential. U.S. Pat. No. 4,753,710 compares bentonite to the aluminum silicate-modified surface on colloidal silica that is taught in WO 86/05826 and U.S. Pat. No. 4,980,025, and found bentonite to be superior. U.S. Pat. No. 4,753,710 teaches the use of at least four pounds bentonite per ton of furnish along with as much as three pounds cationic polymer flocculant per ton of furnish. Bentonitic montmorillonites are described as being metal silicates wherein the metal may be aluminum, and the ratio of silicon atoms to metal atoms is in the range of 5:1 to 1:1. This patent does not disclose that montmorillonites are layered minerals having tetrahedra on their top and bottom layers and an octahedral layer in the center. In the case of 1:1 (atomic ratio) silicon to aluminum, most of the aluminum is in the center octahedral layer where the cationic exchange sites are not available for cationic bonding. The overall surface area of a water swelled montmorillonite can be very large, reportedly as much as 800 $m^2$/gram, but most of the surface is disposed between layers where it as accessible to infused water but not available to participate in bonding to other particulates having calcium on their surfaces.

In another use of aluminum silicate as coagulant microparticulates, U.S. Pat. No. 4,954,220 describes the use of sodium aluminate as well as acids and certain other materials added to sodium silicate solutions to cause the formation of anionic, water soluble polysilicate microgels. The goal of this disclosure was to create colloidal silica analogs that would cost considerably less than colloidal silica. This disclosure relies on the anionic charge of the polysilicate microgel to perform well along with the use of cationic polymer flocculant, and requires the use of a sodium silicate with a $SiO_2/Na_2O$ weight ratio of about 3.3, which is the maximum currently available, apparently in order to provide the maximum commercially available amount of silica per pound in order to produce a polysilicate microgel. While a reaction time of 5% to 95% of gel time is stated, it appears the disclosure is not concerned with overall unit size, although it is claimed that the resultant reaction product consists of three dimensional strings of 3 nm particles. This disclosure (Example 5) implicitly describes the use of an Al/Si weight ratio of 0.3 and claims results equal to colloidal silica. This disclosure does not recognize nor does it claim any advantage in utilizing the cation exchange ability of certain aluminum silicates, namely zeolites.

U.S. Pat. No. 4,980,025 and WO 86/05826 describe the use of aluminum silicates as coagulants in the papermaking process, with emphasis on "greatest improvements" obtained with mechanical or unbleached chemical pulps where "dissolved wood or trash substances" interfere with other programs. This disclosure uses an inorganic sol or aluminum-modified silicic acid sol. The inorganic colloid is taught as consisting of colloidal particles having at least one surface layer of aluminum silicate or aluminum modified silicic acid such that the surface groups of the particles contain silicon atoms and aluminum atoms in a ratio of from 9.5:0.5 (19:1) to 7.5:2.5 (3:1). It is further stated that the benefit of the aluminum atom is to form what is termed as an aluminate ion [$Al(OH)_4-$] that provides a fixed negative charge. No cation exchange ability of a properly formed zeolite, which is an aluminum silicate, is either recognized or claimed. Also, it is taught that the ratios of silicon to aluminum should be from 19:1 to 3:1.

Pummer, in *Das Papier*, 27, Volume 10, 1973, pages 417 to 422, describes the use of aluminum silicates in paper making but in this instance the aluminum silicate is a relatively large particulate used as a filler in paper at levels beyond 2.5%, based on the dry weight of paper.

SUMMARY OF THE INVENTION

An object of the invention is to overcome at least one of the problems described above.

According to the invention, methods of treating water, such as in papermaking and water clarification processes, for example, are provided, whereby a sodium or potassium zeolite crystalloid coagulant ("ZCC") is added to water that contains particulate matter (e.g., cellulosic fiber, filler, and other materials in the case of papermaking, and matter to be removed in the case of water clarification) that has multivalent ions adsorbed on the surfaces thereof. If the particulate matter does not have multivalent cations on its surfaces, a source or sources of multivalent cations may be provided to allow surface adsorption. Through the phenomenon of ion exchange, the ZCC acts as a bridging coagulant. In papermaking, a cationic acrylamide polymer is added before the ZCC. In water clarification, a cationic acrylamide may be added before the ZCC, in certain cases. ZCC is preferably made by reacting sodium or potassium silicate and sodium aluminate in specific proportions under specific conditions resulting in a stable product having particle sizes within a stated range.

Other objects and advantages of the invention will be apparent to those skilled in the art from a review of the following detailed description, taking in conjunction with the appended claims.

DETAILED DESCRIPTION OF THE INVENTION

The invention relates to the use of zeolite crystalloids or sols as coagulants in the clarification of raw fresh waters, process waters, wastes, etc. and also as a coagulant in the manufacture of paper. The materials to be coagulated will either have a suitable amount of multivalent cations on their surfaces or a source of multivalent cations will be provided so as to allow adsorption of the cations onto the surfaces before the ZCC is added. In papermaking, a synthetic linear polymer source of multivalent cations may be adsorbed onto the furnish surfaces. The adsorbed cationic polymer is essentially an extended source of multivalent cations that can displace the exchangeable sodium or potassium ions in the ZCC and so present additional bridging sites for the ZCC. This enhances the clarification of the moving stream of mixtures of cellulose fiber, inorganic filler pigments (e.g., calcium carbonate, clay, and titanium dioxide), sizing agents, starches, gums, etc., so as to promote better retention of these solids on the traveling formation wire, more rapid drainage of water through the traveling wire, and improved uniformity of formation in the dried sheet of paper.

In the invention, the presence of multivalent cations on the surface of the solids to be coagulated is essential for the superior performance of the zeolite crystalloid sols. A key to the process is the ability of the ZCC to exchange sodium or potassium ions for all or part of multivalent cations such as calcium, magnesium, iron, and cationic polymers, either alone or in combination and, accordingly, become bonded to other particulates and fibers having these multivalent cations adsorbed on their surfaces and, in so doing, cause coagulation. (In papermaking, calcium, magnesium, and cationic polymers are preferred cations.)

Suitable sources of multivalent cations include calcium chloride, magnesium chloride, calcium carbonate, magnesium carbonate, ferrous sulfate, ferrous chloride, ferric chloride, ferric sulphate, aluminum sulfate, aluminum chloride, and cationic polymers. (In papermaking, preferred sources of cations are calcium chloride, magnesium chloride, calcium carbonate, magnesium carbonate, and cationic polymers)).

The use of zeolite minerals to remove hardness ions (namely calcium and magnesium) from water is well known in the historical sense; zeolites were replaced long ago with synthetic organic ion exchange resins. To prepare zeolite minerals for water softening, they would be rinsed with a concentrated brine of sodium chloride. This high concentration of sodium would cause the removal of any hardness ions bonded within the crystal lattice and replace them with sodium ions. Then, the excess brine would be rinsed away, and the water to be softened would be flowed through a bed of zeolite mineral. Without the presence of excess sodium ions, the hardness ions were preferentially held by the zeolite and, accordingly, the sodium ions held in the crystal lattice would be replaced by the hardness ions, with the sodium ions remaining with the now softened water.

Zeolites consist of a three-dimensional crystal framework of $SiO_4$ and $AlO_4$ tetrahedra. The tetrahedra are joined by the sharing of oxygen atoms, so that the ratio of oxygen atoms to the total of silicon and aluminum atoms is two. Silicon is tetravalent so that if two silicon/oxygen tetrahedra were joined (two silicon atoms with four oxygen atoms), the resultant structure would be electroneutral. However, aluminum is trivalent, so that two joined tetrahedra made up of one silicon atom, one aluminum atom, and four oxygen atoms would be electronegative with one of the oxygens having only one of its charges satisfied. This deficiency must be satisfied with the inclusion of a cationic charge for each aluminum atom involved. This cation may be exchanged for another cation, e.g., sodium ions may be exchanged for calcium. The tetrahedra are, of course, four-sided and also have four points. The oxygen atoms are located at each point, and the silicon or aluminum atoms are located at the center of the tetrahedron. It is at an oxygen atom at one of the aluminum bearing tetrahedron points where the included exchangeable cation is located.

According to the invention, synthetic zeolites in the sodium or potassium form can be superior coagulants for particles and fibers having multivalent ions on their surface either naturally, as is the case with calcium carbonate pigments, or adsorbed as can be the case with clays and cellulose fibers, for example. On the surface of the zeolite crystal there will be many tetrahedra points with exchangeable sodium or potassium cations associated with the otherwise electronegative oxygen. With relatively low levels of sodium or potassium ions present in the system to be clarified, these exchange points will give up their sodium or potassium cations to bind more strongly to the multivalent cations on the surface of the particle or fiber in the system to be clarified. Being three-dimensional, the zeolite mineral will attach to more than one particle or fiber and, accordingly, coagulate them.

It is well known that synthetic zeolites are easily made by mixing sodium or potassium silicate solutions with sodium aluminate solutions. Although these have been replaced by synthetic organic ion exchange resins for water softening, various forms of them are widely used as catalysts in the petroleum industry because of their unique pore structure and the ability to control the pore sizes in the crystal lattice.

By the use of relatively dilute solutions of sodium silicate and sodium aluminate (or potassium silicate and sodium aluminate), one can control the formation of the zeolite crystalloid sols in sizes from the 1 nm to 3 nm range, which is generally considered to be yet a solution, up to the micron size range. As is the case with most particulate coagulants, very small particle sizes are the most efficient, as more surface area per unit of weight is maximized. According to the invention, a particle size range of at least about 4 nm (and generally up to about 20 nm) is used, with a range of about 4 nm to about 10 nm being preferred, and a range of about 6 nm to about 8 nm (especially 6 nm) being highly preferred. Dissolved material below about 4 nm in size is effective, but the very small size of these molecules restricts their three dimensional bridging ability. This bridging ability, which is very valuable in papermaking and raw water coagulation clarification, improves dramatically at about 4 nm. As the particle size grows above about 20 nm, the penalty of the loss of effective surface area per pound may outweigh the enhanced bridging ability in some, but not all, cases. The large size particles do function as coagulants, but they may not be as effective as those in the preferred ranges in some applications.

The rate of the ZCC formation reaction is dependent upon concentration and temperature. In the manufacture of zeolites for water softening, relatively high concentrations of sodium aluminate and sodium silicate are used because the goal is to produce strong, relatively large particles that can support one another in zeolite beds several feet high. High concentrations instantly produce a solid mass of sodium aluminum silicate (a zeolite), infused with water.

According to the invention, one object is to react solutions of sodium aluminate and sodium or potassium silicate to produce zeolite crystalloids at least about 4 nm in size, preferably in the range of 4 nm to 10 nm, and most preferably in the range of 6 nm to 8 nm, especially 6 nm. This can be accomplished with reactant solution strengths of about 1.0 wt. % to about 5.0 wt. %, preferably about 1.5 wt. % to about 3.0 wt. %. At concentrations much above 3 wt. % to 5 wt. %, the reaction tends to progress too fast to be stopped at the target crystalloid size by quenching to a lower concentration.

In using an approximate 1.5 wt. % solution strength for each reactant, the opalescence that indicates a crystalloid product size in the 4 nm to 6 nm range occurs at about five minutes depending on the $SiO_2/Na_2O$ or $SiO_2/K_2O$ ratio of the sodium or potassium silicate used, and the temperature. At 3 wt. % solution strengths, the opalescence is apparent in as short a time as 15 seconds.

To stop the crystalloid growth, the solution strength is immediately diluted to about 0.5% or less or a dilution sufficient to stop particle growth when the target size is reached. The crystalloid size appears to be stable for at least six days at a 0.5 wt. % concentration, depending upon temperature. If not diluted, the 1.5 wt. % reaction mixture will completely gel in 30 minutes. Greater dilution extends stability.

For example, a sodium ZCC was made using 3 wt. % reactant solutions, as follows. Respective 3 wt. % solutions of Nalco No. 2 sodium aluminate and PQ-M sodium silicate were made using relatively soft water supplied by the Seattle, Wash. city water system. The sodium aluminate solution was added to the sodium silicate solution under vigorous agitation. The first sign of opalescence was noted at 30 seconds after mixing at which time the mixture was diluted to 0.5% by mixing with water in a previously prepared beaker. At the 3 wt. % concentration, it was important to use vigorous agitation. If the sodium aluminate solution was added without the proper agitation, the momentarily high localized concentrations that would result would have caused the generation of many crystalloids larger than the target size.

In most water clarification applications, the ZCC is added in an amount of at least about 0.05 lb/ton of dry particulate matter. In papermaking, the ZCC is generally added in an amount of at least about 0.5 lb/ton dry furnish, and preferably less than about 20 lb/ton dry furnish.

Where water is to be clarified in a clarifier, filter, or centrifuge, the ZCC is preferably added to an influent stream in an amount of at least about 0.25 ppm, and generally up to about 10 ppm, based on total influent flow.

Any suitable cationic acrylamide polymer may be used in the invention. Examples include cationic acrylamide copolymers, mannich polymers, and modified acrylamide homopolymers, as are known in the art. The cationic acrylamide polymer preferably has a cationic molar consisting of at least about 2% (and more preferably about 3% to about 40% in papermaking applications). Polymers having molecular weights of at least about 50,000 are preferred, with molecular weights of at least about 1,000,000 being highly preferred, especially in papermaking applications.

The cationic polymer is preferably used in an amount of at least about 0.01 lb/ton of dry particulate matter in water clarification applications. In papermaking applications, the cationic polymer is typically used in amounts of at least 0.4 lb/ton dry furnish, preferably up to about 4 lb/ton dry furnish.

In water clarification processes, very small concentrations of cationic polymer may be used at times to create faster setting flocs. In cases where faster coagulation and/or more dense floc is desired, for example, as in an overloaded clarifier, filter, or centrifuge, adding a very small amount of a cationic polyacrylamide or cationic homopolymer to the influent stream whose particulate surface has been treated with multivalent cation, only to the level which will cause only the first indication of coagulation is necessary. Conventional jar testing may be used to determine the chemical addition levels required.

Coagulation tests using a calcium-free clay soil have shown that the performance efficiencies of the zeolite crystalloids depend upon the crystalloid size, the $SiO_2/Na_2O$ ratio of the sodium silicate used to prepare the crystalloid, the aluminum/silicon ratio in the crystalloid, and the presence of calcium or other multivalent cations ions on the surface of the materials to be coagulated.

If the mixture of reactants is quenched to a 0.5 wt. % solution strength immediately after mixing, before signs of opalescence, the coagulation performance of the resulting crystalloid is good. The literature suggests that any size below about 3 nm is considered a solution. This solution range is effective in coagulating particulates, but by waiting for the first signs of opalescence, which indicates a crystalloid size of about 4 nm to about 6 nm, the performance improves to excellent. At some point in crystalloid growth the performance falls off to good. Growth to the micron size range decreases the performance to relatively poor (in this context) or to about the same as bentonitic montmorillonites. The first signs of reduced performance occurred at particle sizes of about 10 nm, with significant fall-off over 20 nm in some applications.

PQ Corp. offers eleven grades of sodium silicate solutions that vary primarily in their $SiO_2/Na_2O$ molar ratios but also in concentrations and viscosities. It has been found that the performance of the zeolite crystalloids improves as the weight ratio decreases as follows: 3.25:1, 3.22:1, 2.88:1, and 2.58:1, while maintaining an Al/Si weight ratio of about 1:1.

Additional tests were run using $SiO_2/Na_2O$ weight ratios of 2.50:1, 2.40:1, 2.0:10, and 1.80:1 (using an Al/Si weight ratio of 1:1), but all were inferior to the 2.58:1 weight ratio of PQ-M sodium silicate. PQ-Star sodium silicate, which has an $SiO_2/Na_2O$ weight ratio of 2.50:1, was very close in coagulation performance, being nearly equal at 1 ppm, but falling to a rating of very good at a dosage of 0.5 ppm (compared to "excellent" for sol produced with PQ-M sodium silicate) in native clay slurry clarification tests. The results deteriorated as the $SiO_2/Na_2O$ weight ratio fell below 2.58:1. Generally, the lower ratios were at least as good as colloidal silica or bentonite, but did not show the excellent performance of the ZCCs prepared using PQ-M sodium silicate.

ZCC was also made using potassium silicate and sodium aluminate; specifically PQ Corp.'s Kasil #1 potassium silicate and Nalco No. 2 sodium aluminate. Kasil #1 potassium silicate was chosen because its weight ratio of $SiO_2/K_2O$ of 2.50 was the highest available and it matched the $SiO_2/Na_2O$ ratio of the PQ-Star sodium silicate. The test results equaled those of the ZCC made from PQ-Star. However, because of the high cost of potassium silicate, it is not preferred.

Because the number of exchangeable sodium or potassium cations present in the zeolite crystalloids are dependent upon the number of aluminum/oxygen tetrahedra, one object of the invention is to maximize the presence of aluminum ions consistent with forming a tetrahedral complex structure amenable to bonding to other particulates. Testing indicates that a weight ratio of aluminum to silicon of 1:1 is optimum for the zeolite crystalloids of the invention in terms of performance, efficiency of dosage, persistence of effect, and broadening the range of acceptable system pH. Al:Si weight ratios investigated were 2:1, 1.3:1, 1:1, 0.79:1, 0.72:1, and 0.3:1. For the weight ratios of 2:1 and 1.3:1, an observed drop in performance was presumed to be because of an unsatisfactory crystal structure. For the weight ratios below 1:1, it is believed the observed fall off in performance is due to the decrease in the number of cation exchange sites, which are needed to bond to calcium ions on the surface of the materials to be coagulated. The 0.3:1 weight ratio, for example, never received an excellent rating, even at dosages six times higher than usual for the weight ratio of 1:1. This 0.3:1 weight ratio was no better in performance than bentonite or colloidal silica.

According to the invention, the zeolite crystalloids offer a system of calcium or other multivalent cation "hooks" on their surfaces by virtue of having cation exchange sites offered by the aluminum tetrahedra in the crystalloid lattice structure. In some instances, it may be necessary to supply a source of multivalent cations to the system. For example, a test sample of clay soil from the Seattle, Wash. area slurried in tap water, which was nearly free of calcium and magnesium, did not respond well initially in coagulation tests. (Most clay soils in the Seattle area have been rinsed free of hardness ions, perhaps thousands of years ago, because of the rainy climate.) However, when calcium chloride was added to the clay soil slurry so as to allow calcium ion adsorption on the clay soil surface, the clay soil responded very well, allowing 0.5 ppm dosages of the optimum zeolite crystalloid to produce excellent coagulation of a 9500 ppm clay soil slurry. The supernatant was sparkling clear and colorless, and the persistence of the floc was excellent, as shown by several repeated attempts to redisperse it.

The same kinds of tests were used for a sodium clay commonly used as filler in the manufacture of paper. As is, the clay did not respond well to the coagulant. With calcium chloride added so as to place calcium ions on the surface, the clay responded extremely well, as described for the tested clay soil.

Calcium carbonate pigment responds extremely well to the zeolite crystalloids. Cellulose fiber, bleached or unbleached, does not respond well without calcium being present, but when calcium ions are adsorbed onto their surface, they respond extremely well. The amount of calcium or other multivalent metal cation needed in a specific system is determined empirically, for example, in jar testing, a well known standard test.

The use of the inventive zeolite crystalloids as coagulants according to the invention is of great value in papermaking because of the low cost of the raw materials, ease of manufacture on-site, and the great increase in efficiency of performance per unit weight. Also, the required cationic flocculant dosages may be greatly reduced (e.g., to about 0.6 lb/ton furnish or less) from the 3 lb/ton now commonly used. It is estimated that the polymer and microparticulate costs could be one-quarter or less of most current applications.

EXAMPLES

The invention is further described and illustrated by the following detailed examples, which are not intended to be limiting. Throughout, reference to concentrations in units of "lb/ton" is based on tons of dry furnish, which includes cellulosic fiber and any inorganic filler pigment(s), sizing agents, starches, gums, or other furnish components present.

Example 1
Testing the Efficiency of Zeolite Crystalloid Coagulants in an Alkaline Papermaking Process Tests were run to evaluate zeolite crystalloids in an alkaline papermaking process, as follows.

Bleached hardwood and bleached softwood pulp were refined in a Waring blender at about 3 wt. % consistency for two minutes at high speed. Eighteen grams (solid basis) of a 50/50 mix of fibers were diluted to nine liters. The nine liter mix was adjusted to pH 8.2 after the addition of about 200 ppm calcium chloride. The calcium chloride was added in order to replicate, at least in part, the dissolved calcium expected to be present in an operating machine system making alkaline paper. Half-liter aliquots containing 1.0 gram of fiber were placed in a 600 ml beaker and set on a magnetic stirring device.

One-third gram of precipitated calcium carbonate pigment (PCC) was added to this mixture, with vigorous agitation, followed by a dosage of 0.6 lb/ton furnish of a high molecular weight cationic acrylamide copolymer flocculant containing about 7 mole percent cationic monomer. Large flocs or clumps quickly formed. Vigorous agitation was continued until there was no sign of flocs present. This was meant to replicate conditions where the flocculant is added at the fan pump. At this point, the zeolite crystalloid, produced as previously described with a 2.58:1 $Sio_2/Na_2O$ weight ratio and a 1:1 Al:Si weight ratio, was added at 0.5 lb/ton while agitation continued. Immediately upon addition, the fibers, fines, and pigment coagulated into highly desirable small, discrete flocs, producing a sparkling clear supernatant. Had the large floc clumps persisted, one would expect poor formation on a paper machine forming wire. The persistence of these small discrete flocs under agitation was outstanding, which indicates the promise of superior retention, drainage, and formation on the forming wire. These excellent results held at zeolite crystalloid dosages of up to 20 lb/ton. These very low dosages of an inexpensive material offer the potential for substantial cost savings in the manufacture of paper.

Example 2
Comparing the Efficiency of Zeolite Crystalloid Coagulation to Colloidal Silica in an Alkaline Papermaking Process Simulated alkaline papermaking jar tests (as in Example 1) were run using a 5 nm colloidal silica (CS) as a coagulant compared to the ZCC made with PQ-M sodium silicate solution using an Al/Si weight ratio of 1:1 and with an estimated crystal size of 5 nm to 6 nm (growth was stopped at the first sign of opalescence). With 0.6 lb/ton of CPAM (Allied Colloids Percol-175) and 1 lb/ton of ZCC, clarity and persistence were both excellent and the settling rate after agitation was stopped was fast. With dosages of two, three, and four lb/ton of ZCC the results were the same. Using the colloidal silica as the coagulant and using 0.6 lb/ton of CPAM, a one lb/ton dosage initially looked excellent but quickly deteriorated, having poor floc persistence under agitation. The activity would not be expected to hold up through the paper machine headbox and slice onto the forming table. With a two lb/ton dosage, the results were poor from the beginning. It is apparent that with the cationic flocculant and the anionic CS, the charge balance was very sensitive and had a strong effect on coagulation efficiency. To achieve the same clarity and persistence of 0.6 lb/ton CPAM and 1 lb/ton ZCC, dosages of 3 lb/ton CPAM and 4 lb/ton CS were required and the settling and compaction after agitation was stopped was not as good with the colloidal silica.

Example 3
Comparing a Bentonite Coagulant to Zeolite Crystalloid Coagulants in an Alkaline Papermaking Process Simulated papermaking tests (as in Example 1) were run using Allied Colloids Hydrocol (a processed bentonitic montmorillonite microparticulate coagulant commonly referred to as a bentonite in the literature and related patents). At 0.6 lb/ton CPAM plus 1 lb/ton bentonite the immediate clarity was excellent but persistence was poor, indicating that the results would not last through the paper machine headbox. With two lb/ton of bentonite, the results were the same. Using three lb/ton CPAM and four lb/ton bentonite (dosages commonly reported to be in industrial use), the results were very nearly as good as 0.6 lb/ton CPAM and one lb/ton ZCC. The clarity was excellent, and the persistence and settling rate were very good.

Example 4
Comparing the Efficiency of Large ZCC Particles to 6 nm ZCC Particles

Simulated papermaking tests were run using ZCC particles estimated to be greater than 20 nm in size. The results were good at 0.6 lb/ton CPAM and one lb/ton ZCC, and certainly better than with colloidal silica, but were inferior to the results obtained with of the 6 nm particles.

Example 5

Correcting Formation Problems Caused by Severe Auto-Flocculation of Unbleached Semi-Chemical Fibers Used in Making Corrugated Medium An important function of corrugating medium is to help provide strong resistance to edgewise crushing so that the weight of stacked boxes will not cause the sides to collapse. A well-formed sheet will be stronger per unit of basis weight than a sheet containing clumps of fiber separated by relatively thin areas. The thin areas are the weak links. There is a serious problem in the manufacture of corrugating medium in that the unbleached semichemical, high lignin-containing fibers tend to clump together or autoflocculate as they flow through the paper machine headbox and onto the traveling wire. Using the principles of the invention, it has been found that the addition of calcium ions helps reduce autocoagulation of the fibers by adsorbing onto them. Then the addition of 0.5 lb/ton of a cationic acrylamide copolymer flocculant caused heavy clumping at first but the fibers redispersed with high shear mixing, after which time the addition of four lb/ton of ZCC immediately cleared the suspension without causing clumping. The autoflocculation was eliminated and the ZCC has attached the fiber fines to the longer fibers for good retention of fines, good drainage, and good overall distribution of fibers so that a well-formed sheet may be expected.

Example 6

Demonstrating the Efficiency of ZCC in Clarifying Waters With Heavy Clay Soil Loadings The coagulants were tested for efficiency using a standard 9500 ppm native clay soil slurry augmented with calcium chloride so as to promote calcium ion adsorption on the surface of the native clay soil particles. Three ml portions of this slurry were added to respective beakers. pH levels of 6.4 and 8.2, respectively, were used. Syringes delivering 30 drops/ml were used to add the coagulants. The coagulants tested were diluted to 0.00417 wt. % solids. Accordingly, one milliliter contained about 0.0014 mg coagulant solids. Therefore, one drop added to 3 ml gave an applied dosage of 0.47 ppm or about 0.5 ppm. The coagulant activity was evaluated on the basis of type of floc, rapidity of development, clarity of supernatant, and the persistence of the floc and clarity under agitation.

Table 1, below, lists the results of these tests using ZCC made from sodium silicate and sodium aluminate.

Table 2, below, lists the results of similar tests using ZCC made from potassium silicate and sodium aluminate.

TABLE 1

CLAY SOIL COAGULATION TEST RESULTS

| Weight Ratio $SiO_2/Na_2O$ | Weight Ratio $Na_2SiO_3/Na_2Al_2O_4$ | Weight Ratio Al/Si | pH | Dose (ppm) | Floc[1] | Clarity[1] | Persistence[1] |
|---|---|---|---|---|---|---|---|
| 2.58 | 1.4 | 0.72 | 8.2 | 1.0 | VG | VG | VG |
|  |  |  |  | 0.5 | VG | VG |  |
|  |  |  | 6.4 | 1.0 | VG | VG | P |
|  |  |  |  | 0.5 | VG | VG | P |
| 2.58 | 1.25 | 0.79 | 8.2 | 1.0 | E | E | E |
|  |  |  |  | 0.5 | VG | VG | VG |
|  |  |  | 6.4 | 1.0 | VG | VG | VG |
|  |  |  |  | .50 | VG | VG | VG |
| 2.58 | 0.98 | 1.0 | 8.2 | 1.0 | E++ | E++ | E++ |
|  |  |  |  | 0.5 | E++ | E++ | E++ |
|  |  |  | 6.4 | 1.0 | E++ | E++ | E++ |
|  |  |  |  | 0.5 | E++ | E++ | E++ |
| 2.58 | 0.75 | 1.3 | 8.2 | 2.0 | E | E | E |
|  |  |  |  | 1.0 | G | G | G |
|  |  |  | 6.4 | 2.0 | E | E | E |
|  |  |  |  | 1.0 | G | G | G |
| 2.58 | 0.5 | 2.0 | 8.2 | 1.0 | F | F | F |
|  |  |  |  | — | — | — | — |
|  |  |  | 6.4 | 1.0 | F | F | F |
|  |  |  |  | — | — | — | — |
| 3.22 | 1.2 | 0.78 | 8.2 | 1.0 | VG | VG | G |
|  |  |  |  | 0.5 | VG | VG | F |
|  |  |  | 6.4 | 1.0 | VG | VG | G |
|  |  |  |  | 0.5 | G | G | P |
| 3.22 | 1.06 | 1.0 | 8.2 | 1.0 | E | E | E |
|  |  |  |  | 0.5 | E | E | E |
|  |  |  | 6.4 | 1.0 | G | G | G |
|  |  |  |  | 0.5 | G | G | G |
| 3.25[2] | 3.06 | 0.3 | 8.2 | 2.0 | G | G | G |
|  |  |  |  | 1.0 | G | G | G |
|  |  |  | 6.4 | 2.0 | G | G | G |
|  |  |  |  | 1.0 | VP | VP | VP |
| 2.88 | 1.07 | 1.0 | 8.2 | * | * | * | * |
|  |  |  | 6.4 | * | * | * | * |
| 2.50 | 0.98 | 1.0 | 8.2 | 1.0 | E | E | E |
|  |  |  |  | 0.5 | VG | VG | VG |
|  |  |  | 6.4 | 1.0 | E | E | E |
|  |  |  |  | 0.5 | VG | VG | VG |
| 2.40 | 1.0 | 1.0 | 8.2 | 1.0 | VG | VG | VG |
|  |  |  |  | 0.5 | G | G | G |
|  |  |  | 6.4 | 1.0 | VG | VG | VG |
|  |  |  |  | 0.5 | G | G | G |
| 2.00 | 1.06 | 1.0 | 8.2 | 1.0 | G | G | P |
|  |  |  |  | — | — | — | — |
|  |  |  | 6.4 | 1.0 | G | G | P |
|  |  |  |  | — | — | — | — |
| 1.80 | 1.1 | 1.0 | 8.2 | 1.0 | G | G | F |
|  |  |  | 6.4 | 1.0 | G | G | F |
| Colloidal Silica (5–6 nm) (comparative) |  |  | 8.2 | 2.0 | VG | VG | P |
|  |  |  |  | 1.0 | G | G | P |
|  |  |  | 6.4 | 2.0 | E | E | E |
|  |  |  |  | 1.0 | VP | VP | VP |

*Difficult to reproduce results, possibly because of the polymer-like physical nature of the sodium silicate made dilution difficult.
[1]E++ = Superior
E = Excellent
VG = Very Good
G = Good
F = Fair
P = Poor
VP = Almost no activity

TABLE 2

CLAY SOIL SLURRY COAGULATION TEST RESULTS
USING ZCC MADE FROM POTASSIUM SILICATE AND SODIUM ALUMINATE

| Weight Ratio $SiO_2/K_2O$ | Weight Ratio $K_2SiO_3/Na_2Al_2O_4$ | Weight Ratio Al/Si | pH | Dose (ppm) | Floc | Clarity | Persistence |
|---|---|---|---|---|---|---|---|
| 2.50 | 1.25 | 1.0 | 8.2 | 1.0 | E | E | E |
|  |  |  |  | 0.5 | VG | VG | VG |
|  |  |  | 6.4 | 1.0 | E | E | E |
|  |  |  |  | 0.5 | VG | VG | VG |

It can be seen that the Al/Si weight ratio of 1.0 significantly outperformed the other ratios when the ZCC was made using sodium silicate with an $SiO_2/Na_2O$ weight ratio of 2.58. It is also evident when using this Al/Si weight ratio of 1.0, the ZCC made from the sodium silicate having the 2.58 weight ratio of $SiO_2/Na_2O$ is superior to that made from sodium silicate having different $SiO_2/Na_2O$ ratios. Also, the preferred ZCC significantly outperformed colloidal silica.

Table 2 shows that ZCC made from Kasil #1 potassium silicate and Nalco No. 2 sodium aluminate matches the results shown in Table 1 for an $SiO_2/Na_2O$ weight ratio of 2.50:1 and an Al/Si weight ratio of 1:1. The 2.50:1 weight ratio of $SiO_2$ to $K_2O$ is the highest made by PQ Corp.

consistency stock under low shear conditions. The addition of either colloidal silica (6 nm) or ZCC prepared as previously described in the absence of multivalent cations increased wet sheet consistency (i.e., better drainage) but did not improve single pass retention. Thick stock pretreatment with calcium chloride with ZCC maintained drainage and markedly improved with single pass retention.

The more discrete but strong minifloc formed using calcium chloride and ZCC prior to sheet formation would be expected to result in better retention and formation under the deflocculating conditions of a paper machine forming zone.

TABLE 3

CORRUGATING MEDIUM HANDSHEETS
(pH 6.7)

| Test No. | $CaCl_2$* (lb/ton) | Percol 175 (lb/ton) | Deflocculation Time (seconds) | Colloidal Silica (lb/ton) | ZCC (lb/ton) | Wet Consistency (%) | Single Pass Retention (%) | Drainage | Floc Formation Prior to Forming Sheet | Sheet Formation |
|---|---|---|---|---|---|---|---|---|---|---|
| 7A | 0 | 0 | 10 | 0 | 0 | 8.2 | 81.3 | poor | some | very good |
| 7B | 0 | 0 | 10 | 0 | 0 | 8.1 | 82.5 | poor | some | very good |
| 7C | 0 | 0.6 | 10 | 0 | 0 | 8.2 | 85 | fair | amorphous | good |
| 7D | 0 | 0.6 | 0 | 0 | 0 | 8.1 | 87.5 | fair | very large | poor |
| 7E | 0 | 0.6 | 10 | 1.25 |  | 8.4 | 82.5 | good | small floc | good |
| 7F | 0 | 0.6 | 10 | 0 | 1.25 | 8.3 | 82.5 | good | small floc | good |
| 7G | 26.6 | 0.6 | 10 | 0 | 1.25 | 8.4 | 86.3 | very good | best defined small floc | good |

*400 ppm $CaCl_2$ added to 3% thick stock

It was also observed that the addition of very small amounts of cationic flocculants to waters containing particulates with calcium ions on the surface (so as to barely begin coagulation) significantly enhanced the overall coagulation efficiency when the ZCC was added. The settling rate was much faster. This would be valuable where faster settling is desired or needed as, for example, when clarification equipment is undersized for current operational loadings.

Example 7

Comparison of Physical and Chemical Parameters in Corrugating Medium Handsheet

Table 3, below, shows various combinations of stock and chemical treatments in handsheets prepared from 0.24 wt. %

Example 8

Effect of pH and Multivalent Cation Source on ZCC Performance in Corrugating Medium Handsheets Table 4, below, shows that 10 mole % cationic charge, low molecular weight acrylamide copolymer can be used as stock pretreatment in place of multivalent metal ion in the inventive method. Polydadmac, a highly charged low molecular weight cationic polymer, performed poorly as a stock pretreatment.

The combination of calcium ions and 10 mole, low molecular weight cationic polymer used as a source of multivalent cations produced the best drainage and single pass retention in the inventive method. Raising the pH from 6.7 to 8.0 did not adversely affect system performance.

TABLE 4

CORRUGATING MEDIUM HANDSHEETS

| Test No. | pH | CaCl$_2$ (lb/ton) | Poly-Dadmac (lb actives/ton) | 10 Mole Low MW Cationic Polymer (lb actives/ton) | Percol 175 (lb/ton) | Deflocculating Time (seconds) | ZCC (lb/ton) | Wet Consistency (%) | Single Pass Retention (%) | Drainage | Formation |
|---|---|---|---|---|---|---|---|---|---|---|---|
| 8A | 6.7 | 26.6 | 0 | 0 | 0.6 | 10 | 1.25 | 8.18 | 83.8 | good | good |
| 8B | 6.7 | 0 | 4 | 0 | 0.6 | 10 | 1.25 | 7.8 | 81.3 | poor | good |
| 8C | 6.7 | 0 | 0 | 10 | 0.6 | 10 | 1.25 | 8.3 | 83.8 | good | very good |
| 8D | 8.0 | 0 | 0 | 10 | 0.6 | 10 | 2.00 | 8.6 | 85.0 | very good | very good |
| 8E | 6.7 | 0 | 0 | 10 | 0.6 | 10 | 0 | 8.0 | 80.0 | fair | very good |
| 8F | 8.0 | 26.6 | 0 | 11.25 | 0.6 | 10 | 2.00 | 8.6 | 85.0 | very good | very good |
| 8G | 6.7 | 26.6 | 0 | 0 | 0.6 | 10 | 0 | 7.7 | 82.5 | fair | good |

Example 9
Comparison of the Effect of Aging and Particle Size of ZCC in Retention and Drainage of Corrugating Medium Fresh corrugating medium stock was prepared as previously described and sequentially treated with CaCl$_2$, Percol 175 (deflocculated ten seconds) and 1.25 lb ZCC/ton. Three samples of ZCC were tested (applied as 0.05% dilution) in handsheets.

Results are shown in Table 5, below.

TABLE 5

| Test No. | Age of ZCC 0.38% Solution | Time Until Quench to 0.38% (room temp.) | Wet Consistency (%) | Retention (%) | Formation |
|---|---|---|---|---|---|
| 9A | 6 days (room temp.) | 6 min. 20 sec | 8.34% | 83.8% | very good |
| 9B | fresh | 6 min. 20 sec. | 8.18% | 83.8% | very good |
| 9C | fresh | 8 min. | 8.03% | 80.0% | very good |

Aging had no detrimental effect on the activity of the ZCC in Test 9A. Both of the smaller particle size ZCC's (Tests 9A and 9B) gave a more distinct microfloc than Test 9C, and Tests 9A and 9B performed better in handsheet formation. Both Tests 9A and 9B drained more quickly than Test 9C.

The foregoing detailed description is given for clearness of understanding only, and no unnecessary limitations should be understood therefrom, as modifications within the scope of the invention may become apparent to those skilled in the art.

I claim:

1. A method of making paper in a paper machine, said method comprising the sequential steps of:
   (a) providing an aqueous suspension of a furnish comprising cellulosic fiber, and, optionally, one or more components selected from the group consisting of inorganic filler pigments, sizing agents, starches, and gums, with multivalent cations adsorbed on the surfaces of said fiber and optional components;
   (b) optionally, adding a source of multivalent cations to said suspension of step (a);
   (c) adding to said suspension of step (a) or step (b) cationic acrylamide polymer under deflocculating conditions; and,
   (d) adding to said suspension of step (c) a sodium or potassium zeolite crystalloid coagulant (ZCC) having an average particle sizes in the range of at least about 4 nm, said ZCC having a weight ratio of aluminum to silicon in the range of about 0.72:1 to about 1.3:1, said suspension having sufficient respective amounts of said multivalent cations and said ZCC to effect coagulation of said fibers by ion exchange between said adsorbed cations and the sodium or potassium present in said ZCC.

2. The method of claim 1 wherein the multivalent cations are selected from the group consisting of calcium, magnesium, and cationic polymers.

3. The method of claim 2 wherein the source of multivalent cations is selected from the group consisting of calcium chloride, magnesium chloride, calcium carbonate, magnesium carbonate, and cationic polymers.

4. The method of claim 1 wherein an inorganic filler pigment is present in said furnish and is selected from the group consisting of calcium carbonate, clay, and titanium dioxide.

5. The method of claim 1 wherein the cationic acrylamide polymer has a cationic molar content of at least about 2%.

6. The method of claim 1 wherein said cationic acrylamide polymer has a cationic molar content of about 3% to about 40%.

7. The method of claim 1 wherein the cationic acrylamide polymer has a molecular weight of at least about 50,000.

8. The method of claim 1 wherein said cationic acrylamide polymer has a molecular weight of at least about one million.

9. The method of claim 1 wherein the cationic acrylamide polymer is added in an amount of at least about 0.4 lb/ton dry furnish.

10. The method of claim 9 wherein the cationic acrylamide polymer is added in an amount of up to about 4 lb/ton dry furnish.

11. The method of claim 1 wherein said ZCC is prepared by a method comprising the steps of:
   (i) admixing an aqueous sodium silicate or potassium silicate solution with an aqueous sodium aluminate solution to form a reaction mixture,
   (ii) allowing the reaction mixture to react for a sufficient time to form ZCC particles having particle sizes about at least about 4 nm, and
   (iii) then adding sufficient water to the reaction mixture to provide a diluted reaction mixture containing about 0.5 wt. % or less of ZCC, to terminate the reaction and stabilize the product.

12. The method of claim 11 wherein the respective concentration of each of said sodium silicate or potassium silicate solution and said sodium aluminate solution of step (i) is in the range of about 1.0 wt. % to about 5.0 wt. %.

13. The method of claim 11 wherein the respective concentration of each of said sodium silicate or potassium silicate solution and said sodium aluminate solution of step (i) is in the range of about 1.5 wt. % to about 3.0 wt. %.

14. The method of claim 11 wherein said sodium silicate has an $SiO_2/Na_2O$ weight ratio in the range of about 1.8:1 to about 3.25:1.

15. The method of claim 11 wherein said sodium silicate has an $SiO_2/Na_2O$ weight ratio of about 2.58:1.

16. The method of claim 1 wherein said ZCC has an Al/Si weight ratio of about 1:1.

17. The method of claim 1 wherein said ZCC has particle sizes in the range of about 4 nm to about 10 nm.

18. The method of claim 1 wherein said ZCC has particle sizes of about 6 nm.

19. The method of claim 1 wherein said ZCC is added in an amount of at least about 0.5 lb/ton dry furnish.

20. The method of claim 19 wherein said ZCC is added in an amount of up to about 20 lb/ton dry furnish.

* * * * *

UNITED STATES PATENT AND TRADEMARK OFFICE
CERTIFICATE OF CORRECTION

PATENT NO.   : 5,900,116
DATED        : May 4, 1999
INVENTOR(S)  : Leo E. Nagan

It is certified that error appears in the above-indentified patent and that said Letters Patent is hereby corrected as shown below:

Item [73] On the cover page, after "Sortwell & Co., St. Simons Island, Ga." insert --(part interest)--.

Signed and Sealed this

Nineteenth Day of October, 1999

Attest:

Q. TODD DICKINSON

*Attesting Officer*   *Acting Commissioner of Patents and Trademarks*